United States Patent [19]

Chmiel

[11] Patent Number: 5,089,122

[45] Date of Patent: Feb. 18, 1992

[54] DEVICE FOR THE SEPARATION OF FLUID MIXTURES

[75] Inventor: Horst Chmiel, Leonberg-Ramtel, Fed. Rep. of Germany

[73] Assignee: Fraunhofer Gesellschaft, Munich, Fed. Rep. of Germany

[21] Appl. No.: 649,223

[22] Filed: Jan. 28, 1991

Related U.S. Application Data

[63] Continuation of Ser. No. 380,773, Jul. 18, 1989, abandoned, which is a continuation of Ser. No. 110,030, Oct. 13, 1987, abandoned, which is a continuation of Ser. No. 872,665, filed as PCT/DE85/00304, Sep. 2, 1985, abandoned.

[30] Foreign Application Priority Data

Aug. 31, 1984 [DE] Fed. Rep. of Germany ....... 3432002
May 24, 1985 [DE] Fed. Rep. of Germany ....... 3518871

[51] Int. Cl.$^5$ ............................................. B01D 61/36
[52] U.S. Cl. .............................. 210/185; 210/321.84; 210/321.87; 210/490; 210/500.25
[58] Field of Search ................. 55/158; 210/175, 182, 210/184, 185, 321.6, 321.64, 321.84, 321.87, 500.25, 640, 650, 490

[56] References Cited

U.S. PATENT DOCUMENTS

| | | | |
|---|---|---|---|
| 2,960,462 | 11/1960 | Lee et al. | 210/640 |
| 2,981,680 | 4/1961 | Binning | 210/640 |
| 3,405,058 | 10/1968 | Miller | 210/640 |
| 3,608,610 | 9/1971 | Greatorex | 210/185 |
| 3,624,983 | 12/1971 | Ward | 210/490 |
| 4,230,463 | 10/1980 | Henis et al. | 55/16 |

FOREIGN PATENT DOCUMENTS

| | | |
|---|---|---|
| 0094543 | 3/1984 | European Pat. Off. . |
| 851048 | 9/1950 | Fed. Rep. of Germany . |
| 3304956 | 8/1984 | Fed. Rep. of Germany . |
| 1037132 | 7/1966 | United Kingdom . |
| 2042417 | 9/1980 | United Kingdom . |

Primary Examiner—Frank Spear
Attorney, Agent, or Firm—Kalish & Gilster

[57] ABSTRACT

The invention defines a device for the separation of fluid mixtures, comprising one or several membranes, in which the fluid mixture passes along one side of the membranes while, on the other side, a partial pressure of the constituent to be separated is maintained which is lower than the pressure in the fluid mixture.

The inventive device is characterized by the fact that at least one heatable membrane is provided. The selective (separating) portion of the membrane may be a porous or a pervaporation membrane.

The membrane may also comprise a supporting structure in addition to the selective portion, which may be made of a porous material in a preferred embodiment.

Another preferred embodiment comprises a membrane coated with a material which is preferably wetted by the constituent to be separated by the respective membrane.

11 Claims, 1 Drawing Sheet

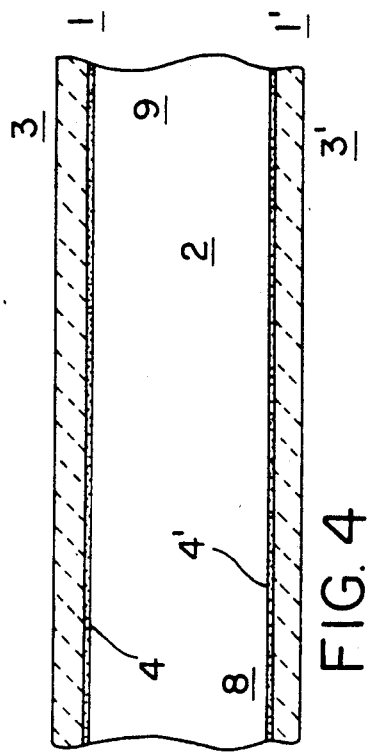
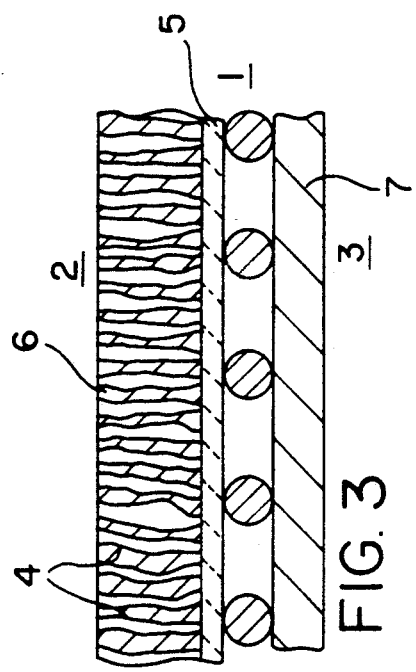
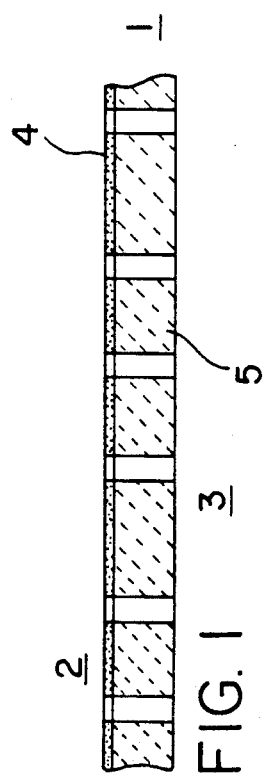
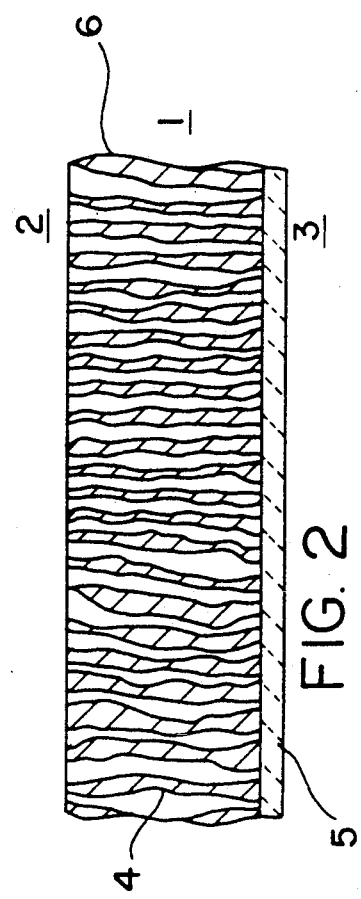

DEVICE FOR THE SEPARATION OF FLUID MIXTURES

This application is based on International Application No. PCT/DE85/00304 (published Mar. 13, 1986 as PCT Pub. No. WO86/01425) entitled DEVICE FOR SEPARATING FLUID MIXTURES and is a continuation of application Ser. No. 07/380,773, filed Jul. 18, 1989, now abandoned, which was a continuation of Ser. No. 07/110,030 filed Oct. 13, 1987, abandoned, which was a continuation of application Ser. No. 06/872,665 filed as PCT/DE85/00304, Sep. 2, 1985, abandoned.

ENGINEERING FIELD

The present invention relates to a device for the separation of fluid mixtures, comprising one or several membranes.

PRIOR ART

A device for separation of fluid mixture has been known, for instance, from the German patent application DE-OS 33 04 956 laid open to public inspection. The device described therein comprises a membrane of the pervaporation type, i.e. a membrane separating fluids on the basis of their different solubility factors (sorption) and the different diffusion coefficients of the individual constituents of the fluid mixture in the material the membrane is made of. The material of the membrane has been so selected that the constituent to be separated from the fluid mixture is dissolved in the membrane material better than the remaining constituents of the mixture. Polymers are an example of the membrane materials employed.

When the fluid mixture is allowed to pass by the membrane on one side while a partial pressure of the constituent to be separated is maintained on the other side, which is lower than the pressure prevailing in the fluid mixture, the constituent to be separated accumulates on that side. The permeate, i.e. the constituent to be separated leaves, however, the membrane in a vapor phase so that the heat required for the conversion from the liquid into the vapor state must be absorbed from the environment. As a result, the fluid mixture cools down. But the cooling of the fluid mixture retards the transportation through the membrane, which is based on the diffusion principle; it may even happen that this transportation is practically caused to come to a total standstill.

This is the reason why the German patent application DE-OS 33 04 956 suggests that heating means be provided in the liquid or fluid mixture passing along one side of the membrane, so as to set an "optimizable" uniform temperature within the chamber containing the untreated medium. According to the German patent application DE-OS 33 04 956, the term "chamber containing the untreated medium" is meant to define the zone through which the fluid mixture passes along the membrane.

Such heating of the fluid mixture, as proposed in the German patent application DE-OS 33 04 956, has a number of disadvantages:

The heating provided in the "chamber containing the untreated medium" does not only heat the fluid permeating through the membrane but also the entire fluid mixture so that the reduction of output is considerable. Moreover, such heating of the fluid mixture may also damage temperature-responsive constituents in the fluid mixture. This is the case particularly when the membrane is used for continuous removal of products from a biological reactor. The fluid mixtures discharged from biological reactors also contain the micro-organisms producing the product to be separated. These micro-organisms are frequently highly responsive to temperature and have a temperature optimum regarding the product output. In these processes, it happens very frequently that it is unavoidable to heat the fluid mixture beyond the optimum temperature in order to achieve a compensation of the heat of evaporation absorbed by the permeating constituent, which may result in a reduction, even stop of the production.

SPECIFICATION OF THE INVENTION

The invention is based on the fundamental idea that at least one heatable membrane should be provided. In this context, the term "membrane" is defined to be any laminar structure which may have not only a separating but also a supporting function. The design of the membrane as a heatable element according to the present invention allows for a heating system which heats only the membrane and the fluid layer immediately adhering the membrane or the constituents present in the membrane. The temperature of the complete fluid mixture is practically not heated due to the local heating of the membrane and the fluid layer surrounding the membrane so that sensitive constituents in the fluid mixture, such as micro-organisms, etc., will not be damaged.

On the one hand, the inventive design of the membrane provides only for a small portion of the fluid mixture which is heated; but mainly the heating energy supplied to the membrane can be so controlled and adjusted that merely the "evaporation or absorption heat" absorbed from the membrane and its environment is re-supplied. Moreover, the local heating substantially reduces the required heating energy.

The basic idea of the invention, i.e. the provision of a heatable membrane, can be utilized not only in devices which employ a separating membrane of the pervaporation type. This basic idea can rather be utilized also in devices having a separating membrane of the porous type, i.e. an ultra-filtration membrane. The heating of the membrane results in a membrane distillation. Regarding the fundamentals of the membrane distillation, reference is made to the article by K. Schneider and T. J. van Gassel "Membrandestillation", published in ChemieIngenieur Technik, 1984, p. 514–521. The inventive heating of the membrane entails, however, the aforementioned advantages over the known devices where the fluid mixture is heated in its entirety.

Certain embodiments of the porous membrane which can be used for membrane distillation: the porous membrane may be either made of an electrically conductive material such as carbon or a metal, especially a sintered metal, or an electrically conductive layer may be applied onto a porous membrane consisting of an insulating material. In any case, the porous membrane can be heated either by direct passage of electric current or by way of induction.

The separating factor of the inventive heatable membrane can be increased even more when the membrane is made of a material construction herein described and claimed, or is coated with a material preferably wetted by the constituent to be separated, on the side facing the fluid mixture.

For instance, the membrane can be coated with a hydrophilic or hydrophobic material for the separation of oil and water, depending on whether the oil or the water is to be removed from a water/oil mixture. Such wettability of the membrane by the constituent to be separated or the non-wettability of the membrane by the constituents to be retained enhances the selective effect of the heating of the membrane so that high separating factors are achieved at high rates of separation.

The selective portion of the membrane—as has been stated before—may, of course, also be of the pervaporation type, i.e. a membrane operating on the principle of solubility. The selective portion of the membrane should be as thin as possible so as to produce technically and economically relevant flows through the permselective membrane. This is the reason why this portion fails to have a sufficient mechanical strength in many cases, especially in consideration of the fact that differential pressures as high as several 100 bar may occur. The selective portion of the membrane therefore often requires a supporting device. (The same may also apply to porous membranes).

According to the invention, the supporting structure itself may be used to heat the perm-selective membrane (or the porous membrane). The design of the supporting structure in the form of a porous metal layer (even though without an actual filter effect) is particularly expedient. Such a metal layer offers not only the advantage of a particularly high strength but it is also simpler to heat.

When a metal having a comparatively bad electrical conductivity is used for the supporting structure this material is suited for resistance heating. Another expedient embodiment of the inventive idea consists in the application of an induction heating system.

The use of a porous supporting structure whose pores do not serve a separating function, provides, among others, for the following advantageous enhancements of the invention: when the walls of the pores are so coated that they will be wetted preferably by the component to be separated by the downstream selective membrane, the result is not only an increased rate of separation. Since the constituent to be separated preferably penetrates into the pores and since, on the other hand, substantially only the fluid mixture is heated in the pores, the heating energy supplied into the supporting structure is utilized especially effectively whereas, at the same time, the damage to constituents and micro-organisms is further reduced.

Apart from the preferred embodiment, which has been described above in more detail, where the porous supporting structure is heated, it is also possible to provide a micro-wave heating system which heats, for instance, directly a pervaporation membrane consisting of a polymer material. Another embodiment provides for a double-layer design of the supporting structure, i.e. in combination with the perm-selective layer a three-layer design of the entire membrane. The two layers of the supporting structure consist, for instance, of the porous metal layer with a restricted thickness, and of another grid-type supporting structure having coarse pores or fine meshes. This structure is required, for instance, when the mechanical strength of the porous metal layer is insufficient in view of the negative pressure applied. The heating can be achieved either in either or in both layers of the supporting structure.

The aforedescribed inventive embodiments can also be combined with each other:

It is possible, for instance, to provide more than one heatable membrane so as to separate more than one constituent from the fluid mixture: for the separation of oil/water mixtures, one of the membranes can be so coated, for instance, that it is preferably wetted by oil or is hydrophobic, whereas the other membrane is coated so as to render it hydrophilic. When the two membranes are so arranged that they form walls delimiting a passage through which the oil/water mixture flows, this arrangement may have the effect that both oil and water are continuously removed from the oil/water mixture, achieving an approximately constant overall concentration. A roughly constant oil concentration in water or water concentration in oil, however, enhances the separating effect of the inventive device, compared to a device where the concentration of one constituent undergoes a constant decrease. The use of a hydrophobic or hydrophilic coating is, of course, to be understood only as an example of the general inventive idea which provides for a coating of the porous or pervaporation membrane or its combination with a porous material such that it is preferably wetted by that constituent which is to be separated by the respectively other membrane.

It is also possible, for instance, to arrange a porous membrane in such a way that it surrounds a pervaporation membrane concentrically. The porous membrane can then be used as a "preliminary separating stage" with the additional effect of retaining constituents such as microorganisms or the like which would form a deposit on the pervaporation membrane.

BRIEF DESCRIPTION OF THE DRAWING

In the following, the invention will be described in more detail with reference to the drawing, wherein:

FIG. 1 illustrates a first embodiment of an inventive device comprising a porous membrane;

FIG. 2 shows a second embodiment of an inventive device comprising a pervaporation membrane;

FIG. 3 is the drawing of a variation of the embodiment shown in FIG. 2, and

FIG. 4 illustrates an arrangement of membranes designed according to the present invention, in a device separating more than one constituent from a fluid mixture.

All the embodiments shown in FIGS. 1 through 4 share the common feature that a fluid mixture passes along one side 2 (fluid side) of a membrane structure 1 having a separating and a supporting function, in a passage not shown in detail here, while specific means, which are not shown in detail, on the other side 3 (permeate side) are provided to maintain a partial pressure of the constituent to be separated, which is lower than the pressure prevailing on the side of the fluid mixture. Such means maintaining a lower partial pressure may, for instance, be a suction means, a cooling trap or an inert gas flow. The fluid mixture may be of any kind, e.g. an aqueous solution, an oil/water mixture or a product/substrate mixture discharged from a biological reactor; the mixture may also be a mix of gaseous constituents as well.

FIG. 1 shows an embodiment of the inventive device where the membrane structure 1 comprises a porous membrane, e.g. an ultrafiltration membrane structure, 5 as the selective layer. The porous membrane 1 is coated with a material 4 on the side 2 where the fluid mixture passes from which a constituent is to be separated; this coating is preferably wetted by the constituent to be separated. If, for instance, one constituent is to be separated from an aqueous solution the coating 4 of the porous membrane 1 may be made of a polyolefin or a polyfluoric hydrocarbon such as polytetrafluoro-ethylene or polyvinylidene fluoride. Such materials are largely not wetted by water (in this relation reference is made to the aforementioned article "Membrandestillation).

Vice versa, the coating 4 may also be hydrophilic, e.g. for separation of water from an aqueous solution.

The porous membrane itself in the embodiment shown here is made of a metal so that it can be heated by direct passage of electric current therethrough or by way of induction, for instance.

FIG. 2 shows another embodiment of the present invention where the membrane structure 1 comprises a selective layer 5 and a supporting structure 6. The selective layer 5 is a pervaporation membrane which may be made of a polymer or a silicon rubber. The supporting structure 6 may be a porous metal without its own separating function.

As becomes evident from FIG. 3, another supporting structure 7 may be provided in addition to the supporting structure 6, which may consist of an interlaced wire netting, a metal screen, or the like. This secondary supporting structure is provided when the structure 6 alone would not be sufficient to afford a sufficient mechanical stability, e.g. in the event of high pressure differentials. This netting- or screen-type supporting structure is preferably arranged on the permeate side 3 since it does not interfere with the flow of the fluid mixture on this side.

The walls of the pores of the porous metal layer 6 are also coated with a material 4 which is preferably wetted by that constituent which is to be separated by the respective selective layer—in the embodiments illustrated: the pervaporation membrane 5. This coating is analogous to the coating applied in the embodiments shown in FIGS. 2 and 3. This design entails a number of advantages:

The preferred wetting of the inside of the pores by the constituent to be separated enhances the separating action since the concentration of the constituent to be separated inside the pores is higher than in the fluid mixture.

Since the pervaporation membrane 5 is preferably heated through the porous metal layer 6 and/or the supporting structure 7, only the fluid mixture in the pores is substantially heated. This effect reduces not only the required heating energy but also possible damage to sensitive substances, e.g. micro-organisms.

FIG. 4 shows an embodiment of the invention where more than one constituent is be separated from a fluid mixture. This arrangement comprises two membranes 1 or 1' forming the walls defining a passage 2 having an inlet opening 8 and an outlet opening 9, through which the fluid mixture passes. The selective portions of membrane 1 or 1' may be pervaporation membranes or porous membranes. It is also possible to design one membrane as a pervaporation element while the other membrane is of the porous type. One membrane 1 is so coated that it is preferably wetted by one constituent to be separated while the other membrane 1' is coated with a layer 4' which is so selected that it is preferably wetted by the other constituent to be separated.

When the separation of oil and water from an oil/water mixture is intended, for instance, the coating 4 may be hydrophobic while the coating 4' is hydrophilic. It is also possible to use an uncoated pervaporation membrane instead of the coated membrane, which matches the high solubility and diffusion of oil in this combination.

The arrangement shown in FIG. 4 entails the advantage that one membrane is used to separate one constituent, i.e. oil, while the other membrane separates the other constituent, i.e. water in this example, from the fluid mixture which may be the aforementioned oil/water mixture. As a result of this arrangement, the concentration in the fluid mixture in passage 2 along the membrane largely remains constant so that a constant factor of separation is achieved along the overall length of the membrane, whereas in other arrangements the concentration of one constituent decreases in the direction of flow. Moreover, the conversion of an oil/water mixture into a water/oil mixture is prevented. This conversion substantially reduces the separating effect of the known devices.

In the foregoing, the invention has been described with reference to specific embodiments. The general framework of the basic inventive idea of heating the membrane encompasses the most different modifications. One example is the heatability of the membrane in the manner described in the German patent application DE-OS 29 26 941. It is also possible to provide for additional unheated or heated membranes serving other separating functions: A heated pervaporation membrane may be arranged, for instance, upstream of a porous membrane to retain micro-organisms or the like.

The present invention is, of course, not restricted to the afore-described "linear" arrangements. It is also possible to install the components in a cylindrical arrangement. Such geometries allow, for instance, the separation of one constituent through the axis of the cylinder while the other constituent is separated through the circular wall. Moreover, the inventive heatable membranes may be combined with other separators. For instance, a membrane of the inventive design may be inserted in the form of a dip pipe of a hydrocyclone. The heatable membranes according to the present invention can be used to realize any known geometry, e.g. arrangements comprising separator modules in tandem relationship.

I claim:

1. Device providing means for separating a fluid mixture comprising at least one membrane having a fluid mixture side along which the mixture passes for separation and having an opposite, permeate side providing a separated constituent of the fluid at which side partial pressure is maintained on the separated constituent, each said membrane comprises at least one selective porous portion consisting of current conducting material which is itself a heatable element providing means for heating the membrane selective portion either by direct passage of current through the current conducting material or inductively, said membrane and means for heating being constructed and arranged to heat only the membrane and a fluid layer surrounding the membrane without heating of the complete mixture.

2. Device according to claim 1, the selective portion being coated on the fluid mixture side with a material wettable by the constituent to be separated.

3. Device according to claim 1 or 2, further characterized in that each said membrane comprises multiple layers, one of which is of said current conducting material.

4. Device according to claim 3, the selective portion being of the pervaporation membrane type, wherein the separated constituent is dissolved.

5. Device according to claim 1, said at least one membrane comprising also a supporting structure for supporting the selective portion.

6. Device according to claim 5, the supporting structure comprising porous material.

7. Device according to claim 6, the porous material and pore walls thereof being coated with a material wetted by the separated constituent.

8. Device according to claim 5, the supporting structure comprising a porous metal.

9. Device according to claim 1, comprising a plurality of said membranes, each having a fluid side exposed to the fluid mixture, each said membrane respectively separating from the fluid mixture different constituents thereof.

10. Device according to claim 9, said plurality of membranes forming walls defining a passage through which the fluid mixture flows.

11. Device according to claim 1, the selective portion being provided with an electrically conductive coating.

* * * * *